Oct. 19, 1971     R. FITZPATRICK ET AL     3,613,251

HAND HELD BEARING COMPASS

Filed April 2, 1969     2 Sheets-Sheet 1

INVENTORS
RICHARD FITZPATRICK
RICHARD D. FITZPATRICK
WILLIAM BALCH

BY *McCormick, Paulding & Huber*

ATTORNEYS

Oct. 19, 1971  R. FITZPATRICK ET AL  3,613,251

HAND HELD BEARING COMPASS

Filed April 2, 1969  2 Sheets-Sheet 2

INVENTORS
RICHARD FITZPATRICK
RICHARD D. FITZPATRICK
WILLIAM BALCH

BY *McCormick, Paulding & Huber*

ATTORNEYS

United States Patent Office 3,613,251
Patented Oct. 19, 1971

3,613,251
HAND HELD BEARING COMPASS
Richard Fitzpatrick and Richard D. Fitzpatrick, Wethersfield, and William Balch, Bolton, Conn., assignors to Quint Machine Corporation, Manchester, Conn.
Filed Apr. 2, 1969, Ser. No. 812,681
Int. Cl. G01c 17/10
U.S. Cl. 33—72
3 Claims

ABSTRACT OF THE DISCLOSURE

A magnetic compass, specially adapted to be held by hand, includes a transparent compass bowl housing a transparent compass card. A lubber line and a pair of sights on the bowl enable the compass to be used for taking bearings of distant objects for navigational purposes. Attached to the bottom of the bowl is a base including a generally cylindrical vertical hand grip. This grip also serves as a housing for batteries for energizing a lamp used to illuminate the bowl and card for nighttime use. There is a wrist strap fixed to the base.

BACKGROUND OF THE INVENTION

This invention relates to magnetic compasses, and deals more particularly with such compasses particularly adapted to be held by hand and used for taking bearings.

The general object of this invention is to provide a portable magnetic compass which is of a relatively simple construction yet quite rugged and accurate. The compass may be put to various different uses and is especially well adapted for use on boats as a navigational instrument for taking bearings of the boat relative to distant landmarks, navigational buoys or other targets.

A further objects of this invention is to provide a compass of the foregoing character which may be comfortably held and operated by one hand, which includes illumination for night-time use and which includes a stop easily operated by one finger of the hand holding the compass to stop rotation of the compass card while a reading is being taken.

SUMMARY OF THE INVENTION

The invention resides in a magnetic compass including a transparent compass bowl containing a transparent compass card having graduations on an upwardly inclined conical surface. A lubber line extends down at least one side of the compass bowl and on top of the bowl are two spaced sights in the vertical plane of the lubber line used for aiming the compass toward a distant object the bearing of which is to be taken. The bowl is supported by a base which includes a generally cylindrical vertical grip portion and which is hollow to provide a receptacle for receiving batteries used to energize a lamp position beneath the compass bowl for illuminating it and the card for nighttime use. A flat bottom surface on the base allows the compass to be supported on a horizontal surface when not held by hand, and a wrist strap connected with the base prevents accidental loss of the compass.

DESCRIPTION OF THE PREFERRED EMBODIMENTS

Turning to the drawings, and first considering FIGS. 1 to 5, a hand held bearing compass embodying this invention is indicated generally at 20 and is comprised basically of a bowl assembly 22 and a base assembly 24. The bowl assembly 22 provides the structure performing the actual compass function, and the base assembly 24 provides a support for the bowl assembly and also provides a hand grip for grasping the compass during use and a means for illuminating the bowl assembly during nighttime use, as well as serving other functions.

Figure 2:
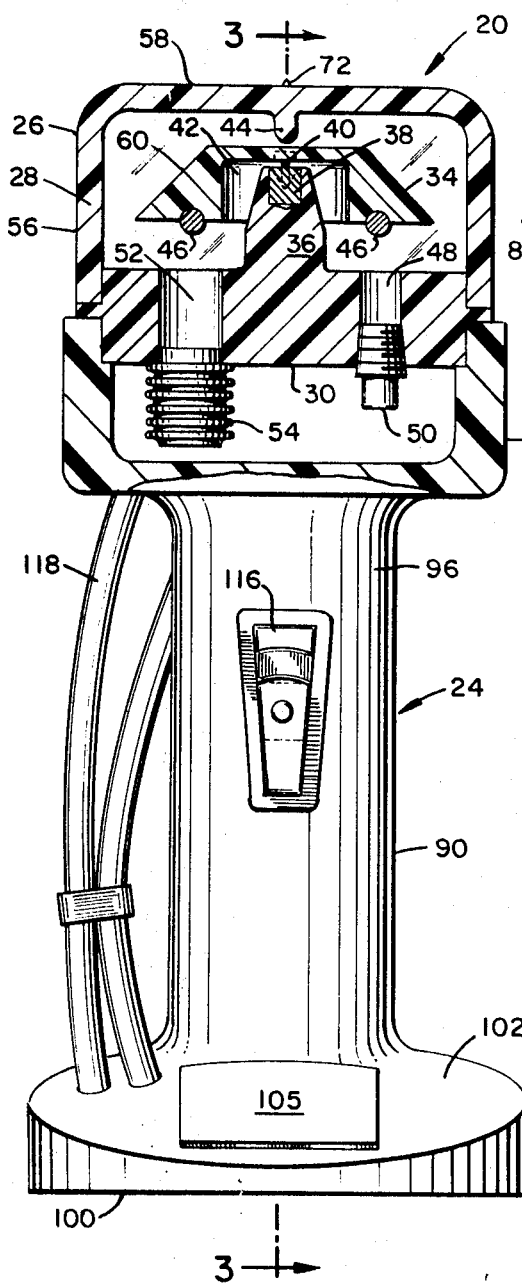
FIG. 2 is a front elevational view of the compass of FIG. 1 with the upper portion of the compass being shown broken away on the line 2—2 of FIG. 3 to reveal various details of construction.

Considering first in detail the bowl assembly 22, this assembly is comprised of a transparent bowl 26 consisting in turn of an inverted cup-shaped member 28 and a bottom member 30, both of which members are made of a transparent plastic material. The bottom member 30 is bonded by a suitable adhesive to the cup-shaped member 28 so as to form a fluid tight chamber 32. The chamber 32 receives the compass card 34 which is supported relative to the bowl 26 for movement about a vertical pivot axis generally aligned with the central axis of the bowl. The means for so supporting the card 34 comprises a vertical central stem 36 extending upwardly from the bottom bowl member 30 and carrying in its upper end a bearing member 38 having an upwardly facing bearing recess which receives a downwardly extending pivot pin 40 fixed to the card 34, the card as shown in FIG. 2, having a downwardly facing recess 42 for accommodating the upper end of the stem 36. A short centrally disposed finger 44 is formed integral with the bowl member 28 and extends downwardly therefrom into close proximity to the upper face of the card 34 to retain the pivot pin of the card in the bearing member 38.

Figure 4:
FIG. 4 is a horizontal sectional view taken on the line 4—4 of FIG. 3.

The card 34 carries two pole seeking magnetic elements in the form of two permanent magnets 46, 46. The magnets 46, 46, as best shown in FIGS. 2 and 4, are arranged parallel to one another in a horizontal plane and are located on opposite sides of the central axis of the stem 36 and equally spaced therefrom. They are received in grooves formed in the underside of the card 34 and are fixed thereto by adhesive or other suitable means.

The bowl chamber 32 is filled with a clear fluid of any well known type, such as kerosene, conventionally used for such purpose and, in order to permit the filling of such fluid into the chamber, the bottom member 30 includes a filling port 48 which is normally closed by a threaded plug 50. An expansion chamber to compensate for changes in the volume of the chamber fluid due to changes in temperature is provided by another port 52 extending through the bottom member 30 and communicating with a compensating bellows 54 which is closed at its bottom end and which has an open upper end sealed by adhesive or the like in the port 52. The bellows 54 expands and contracts with changes in the volume of the fluid to accommodate such changes.

In considering further the construction of the bowl assembly 22, it will be noted that the upper cup-shaped bowl member 28 provides the bowl with a generally cylindrical sidewall 56 and a substantially flat top wall 58. The bottom member 30 in turn provides a bottom wall. In the use of the compass it is desirable that the card 34 be capable of being read both by viewing it through the sidewall 56 and by viewing it through the top wall 58, and therefore to provide for this the compass card includes a generally upwardly and outwardly facing conical scale surface 60 on which the scale graduations 62, 62 and other pertinent indicia appear. The fact that this allows the graduations to be read by viewing through both the sidewall and the top view wall will be appreciated by considering FIG. 3 which shows the card 34 as viewed through the sidewall 26 and FIG. 4 which shows the card as viewed through the top wall 58.

Figure 1:
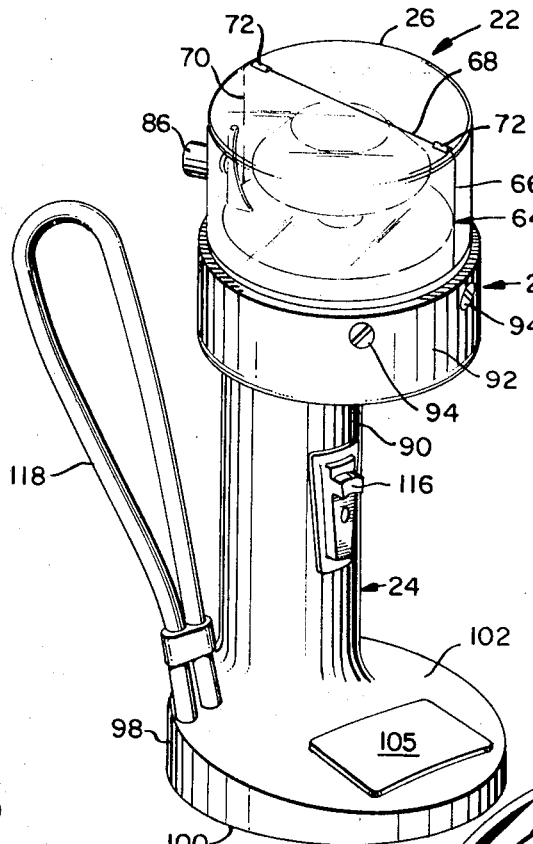
FIG. 1 is a perspective view of a magnetic hand held bearing compass embodying this invention.

When taking bearings, the compass card 34 is normally viewed by viewing through the side wall 56, and for taking such readings the bowl member 28 includes a lubber line 64, as best shown in FIG. 1. As seen in this figure, the lubber line 64 extends vertically along the side wall 56 in the front thereof, extends diametrically across the top wall 58, and then extends along the side wall 56 in the rear thereof and at a point diametrically opposite from the front vertical portion of the line. The lubber line 64 is or may be a continuous one and the top or horizontal portion is indicated at 68, and the rear vertical portion is indicated at 70. The front vertical portion 66 is used when reading the card 34 by viewing through the side wall 56 and the top horizontal portion 68 is used when reading the compass card through the top wall 58. The rear vertical portion 70 may be omitted, if desired; however, it is preferably retained as when reading through the side wall it services as a means for eliminating parallax. That is, when looking toward the front of the compass and viewing the card through the side wall the rear lubber line portion 70 can be observed and may be aligned with the front portion 66 of the line to assure a proper line of sight to the compass card to obtain a correct reading thereof.

For the purpose of aiming the compass toward a distant object the bearing of which is to be taken, a sighting means is provided on the upper portion of the bowl member 28. This sighting means may take various different forms, but in the illustrated case comprises two prism shaped sights 72, 72 extending upwardly from the top wall 58 and having sharp upper edges located in the vertical plane of the lubber line 66, the two sights 72, 72 being spaced from one another diametrically of the bowl as shown in FIG. 1. The sights 72, 72 may be either formed integrally with the bowl member 28 or may constitute separate pieces attached thereto by adhesive or the like.

Figure 5:
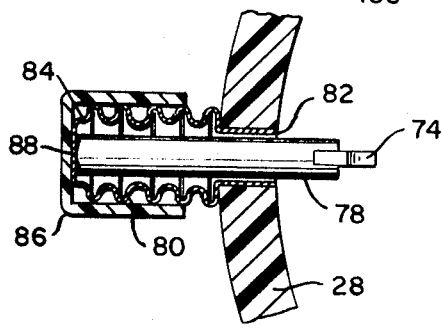
FIG. 5 is an enlarged fragmentary sectional view showing the construction of the card stop and its seal.
Figure 3:
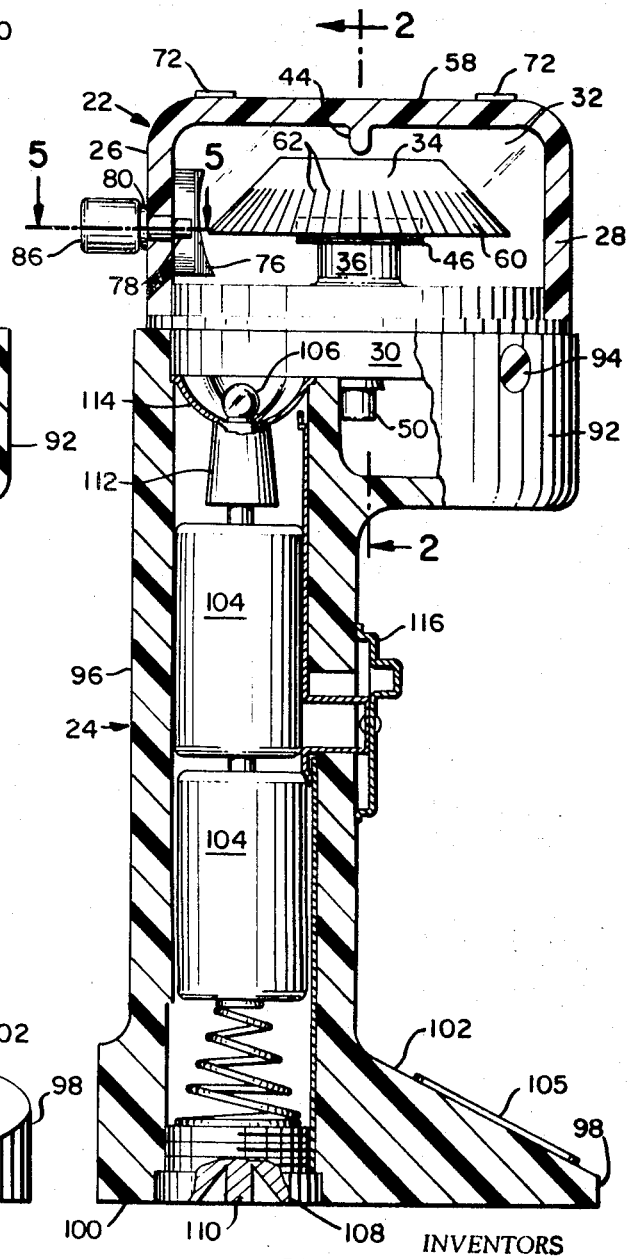
FIG. 3 is in general a vertical sectional view taken on the line 3—3 of FIG. 2.

A means is also provided for stopping movement of the compass card 34 while a reading is being taken, and in the illustrated embodiment such means constitutes a stop member 74, shown best in FIGS. 3 and 5, located within the bowl chamber 32 and having a vertically curved edge 76 facing the card 34. The stop member 74 is manually movable inwardly toward the card 34 to bring the face 76 into engagement with the lower peripheral edge of the card 34 to temporarily hold the card against movement relative to the bowl. The stop member 74 is supported by an actuating stem 78 which passes through an opening in the side wall 28. A seal between the actuating stem 78 and the side wall 28 is provided by a small bellows 80 having its open end 82 received in the wall opening and fixed and sealed thereto by a suitable adhesive. The actuating stem 78 extends through the bellows 80 and is fixed, in the interior of the bellows, as by soldering, to the outer or closed end 84 thereof. A cup-shaped button 86 receives the bellows 80 and is fixed to the outer end thereof as at 88, by a suitable adhesive or other bonding agent. Therefore, by pressing inwardly on the button 86 by use of the finger or thumb of the user, the actuating rod 78 is moved inwardly to press the associated stop member 74 against the card to stop its movement. It should, of course, be understood, however, that the stop button 86 is not actuated while the compass is being aimed or while the compass card is still moving during such aiming under the influence of the earth's magnetic field. Instead, it is intended to be actuated after a sighting has been made by aligning the sights 72, 72 with the distant object, and after the card stops rotating, but before the user moves his eyes from the sights to the lubber line and card for reading the card graduations. That is, after the sights 72, 72 are targeted on the distant object the button 86 may be depressed to hold the compass card 34 in the position occupied when such alignment is made to prevent any inadvertant movement thereof while the subsequent reading is taken by reference to the lubber line and card graduations.

Considering next the construction of the base assembly 24, this assembly includes a base member 90 preferably made of an opaque colored plastic material. At its upper end the base 90 includes a cylindrical portion 92 of substantially the same diameter as the compass bowl 26 and which serves to receive the lower end of the bowl. That is, the lower portion of the bottom member 30 of the bowl is received in the upper end of the cylindrical portion 92 and is retained therein by a number of screws 94, 94 passing through the wall of the portion 92 and threaded into the bottom member 30. By removing the screws 94, 94, the bowl 26 may be readily removed from the base 90.

Extending downwardly from the upper cylindrical portion 92, and with its vertical axis offset to the rear of the vertical axis of the portion 92, is a smaller diameter vertical grip portion 96 which at its lower end terminates in an enlarged generally cylindrical bottom portion 98 having a flat bottom surface 100. The bottom portion 98 has its vertical axis forwardly offset from the vertical axis of the grip portion 96 and is of a slightly larger diameter than the upper cylindrical portion 92. The bottom portion 98 includes an inclined top surface 102 to which is adhered a patch 105 of material, such as a matte finished white plastic sheet, capable of receiving pencil notations which may be readily erased therefrom, the patch 105 therefore serving as a convenient place for temporarily recording notes as to bearings, etc.

The grip portion 96 is of such a size and shape as to be conveniently gripped by the hand of a user to enable the user to hold the compass in a sighting position in front of his face and eyes. In addition to this function, however, the grip portion is also hollow and defines a chamber 103 for receiving a pair of conventional batteries 104, 104 used for energizing a lamp 106 for illuminating the compass bowl and card during nighttime use of the compass. The batteries 104, 104 are retained in the base by a plug 108 threaded into the bottom portion 98 from the bottom surface 100 and containing a crossbar 110 formed by two spaced parallel recesses so as to permit the plug to be readily grasped and removed by the finger and thumb of the user. The lamp 106 is contained in a holder 112 which also includes a reflector 114. A switch, indicated at 116 and of conventional construction, is used to turn the lamp 106 on and off. The lamp is located directly below the transparent bottom member 30 of the bowl, so that light radiated therefrom is passed through the transparent bottom member 30, through the transparent fluid in the chamber 32, and through the transparent card and transparent cup-shaped bowl member 28 to illuminate the compass card and the bowl for nighttime use. As to this illumination, it is particularly desirable that the graduations and indicia of the compass card and the lubber line be made distinctly visible and for this purpose it is preferable that such graduations, indicia and lubber line be defined by opaque material, preferably received in corresponding grooves or depressions so as to be highly distinguishable from the adjacent transparent material.

In order to prevent accidental loss of the compass, as by inadvertently releasing it when using it on a small boat, the base assembly preferably includes, as shown, a wrist strap 118 fixed to the bottom portion 98 of the base 90. The strap 118 extends upwardly from the upper surface 102 and is of such a size as to be readily received on the wrist of the hand used to grip the grip portion 96.

Figure 6:
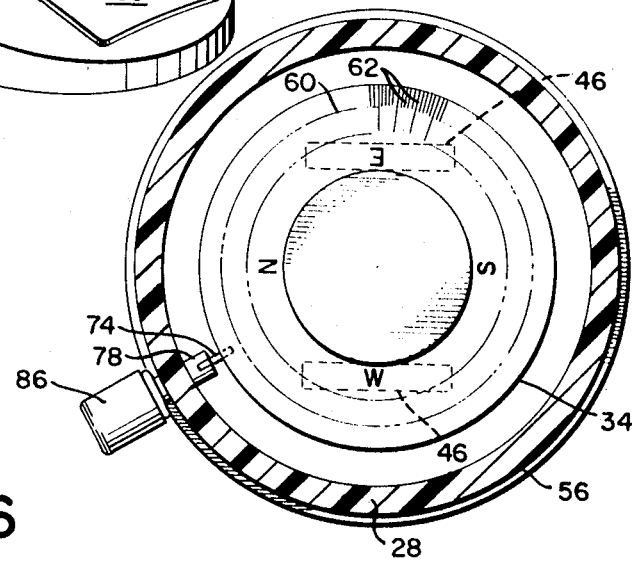
FIG. 6 is an enlarged fragmentary horizontal sectional view taken through the bowl of an alternative embodiment of the invention in the vicinity of the lubber line.
Figure 6:
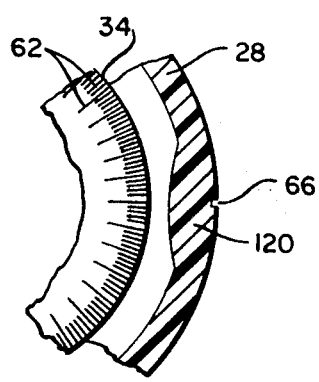

In the compass 20 shown in FIGS. 1 to 5, the side wall 56 of the bowl member 28 is of a uniform thickness at all points. If desired, however, and as shown in FIG. 6, this side wall may be shaped in the vicinity of the front portion 66 of the lubber line to produce a converging lens area 120 which presents a magnified image of the adjacent portion of the compass card to the viewer, thereby enabling the card 34 to be read more accurately.

We claim:

1. In a compass, the combination comprising a compass bowl assembly, a base member connected with said bowl assembly, said bowl assembly including a bowl and a compass card received in said bowl for rotation about a generally vertical axis, said base member including a generally cylindrical hand grip portion extending generally downwardly from said bowl assembly and an enlarged bottom portion located below said hand grip portion and having a relatively extensive downwardly facing flat bottom surface, and a wrist strap connected to said bottom portion of said base member and extending upwardly therefrom adjacent said hand grip portion for receiving the wrist of the hand used to grasp said hand grip portion to prevent inadvertent loss of said compass.

2. The combination defined in claim 1 further characterized by means forming a lubber line on said bowl, and sighting means on the top of said bowl for aiming said bowl along a line of sight located in the vertical plane containing said lubber line, said sighting means comprising two diametrically spaced protrusions extending upwardly from said top of said bowl and having aligned upper edges located in the vertical plane of said lubber line.

3. In a compass, the combination comprising a compass bowl having a generally cylindrical side wall and a top wall and a bottom wall, said side wall and said top wall being made of a transparent material, a compass card supported in said compass bowl for rotation about a generally vertical axis generally coincident with the central axis of said side wall and carrying at least one pole seeking magnetic element, said card including a scale surface bearing graduations which scale surface is of such a shape as to face both upwardly and outwardly to enable said graduations to be viewed both through said side wall and said top wall, means forming a lubber line on said bowl extending vertically along said side wall thereof at one point along its circumference, sighting means on said top wall of said bowl for aiming said bowl along a line of sight located in a vertical plane containing said lubber line, a base attached to the bottom of said bowl, said base including a vertical hand grip portion extending generally downwardly from said bowl and of such a size in horizontal cross-section as to enable it to be conveniently gripped by the hand of a user, said base also including a bottom portion below said grip portion which bottom portion has a size in horizontal cross-section substantially greater than that of said grip portion and which bottom portion provides a downwardly facing flat bottom surface of a size substantially greater than said size in horizontal cross-section of said grip portion, and a wrist strap connected to said bottom portion of said base and extending upwardly therefrom adjacent said hand grip portion for receiving the wrist of the hand used to grasp said hand grip portion to prevent inadvertent loss of said compass.

References Cited

UNITED STATES PATENTS

| | | | |
|---|---|---|---|
| 1,966,850 | 7/1934 | Colt | 33—223 UX |
| 2,018,536 | 10/1935 | Salsgeber | 33—223 |
| 2,552,332 | 5/1951 | Le Van | 33—72 X |
| 2,955,357 | 10/1960 | Vebelhardt | 33—72 |
| 3,502,857 | 3/1970 | Cleveland et al. | 33—223 X |

FOREIGN PATENTS

| | | | |
|---|---|---|---|
| 405,252 | 11/1909 | France | 33—223 |
| 615,610 | 10/1926 | France | 33—223 |
| 774,576 | 9/1934 | France | 33—223 |
| 21,634 | 10/1908 | Great Britain | 33—222 |
| 6,571 | 3/1911 | Great Britain | 33—222 |
| 299,180 | 10/1928 | Great Britain | 33—223 |
| 582,691 | 11/1946 | Great Britain | 33—223 |
| 883,839 | 12/1961 | Great Britain | 33—222 |
| 435,196 | 5/1948 | Italy | 33—69 |
| 27,356 | 8/1909 | Sweden | 33—72 |

ROBERT B. HULL, Primary Examiner

U.S. Cl. X.R.

33—223